(12) United States Patent
Dylag et al.

(10) Patent No.: US 7,120,140 B1
(45) Date of Patent: Oct. 10, 2006

(54) DIGITAL BROWSER PHONE

(75) Inventors: Edwin M. Dylag, Grand Island, NY (US); Robert H. Fritzinger, Williamsville, NY (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/513,660

(22) Filed: Feb. 25, 2000

Related U.S. Application Data (60) Provisional application No. 60/121,755, filed on Feb. 26, 1999.

(51) Int. Cl.
*H04L 12/66* (2006.01)
(52) U.S. Cl. ...................... 370/352; 370/356
(58) Field of Classification Search ............ 370/351, 370/352–356, 389, 401, 466, 493, 494, 465; 709/203, 230, 227
See application file for complete search history.

(56) References Cited

U.S. PATENT DOCUMENTS

| | | | |
|---|---|---|---|
| 4,763,356 A | 8/1988 | Day et al. ............ 379/368 |
| 5,754,636 A | 5/1998 | Bayless et al. | |
| 5,764,628 A | 6/1998 | Davis ................ 370/271 |
| 5,892,764 A | 4/1999 | Rieman et al. ........ 370/401 |
| 6,170,011 B1 * | 1/2001 | Macleod Beck et al. ... 709/224 |
| 6,373,857 B1 * | 4/2002 | Ma ................. 370/475 |
| 6,385,192 B1 * | 5/2002 | Kozdon et al. ........ 370/352 |
| 6,563,814 B1 * | 5/2003 | Rowan et al. ........ 370/352 |
| 6,587,433 B1 * | 7/2003 | Borella et al. ........ 370/230 |
| 6,594,269 B1 * | 7/2003 | Polcyn .............. 370/401 |
| 6,600,733 B1 * | 7/2003 | Deng ................ 370/352 |
| 6,721,306 B1 * | 4/2004 | Farris et al. .......... 370/352 |
| 6,795,867 B1 * | 9/2004 | Ma et al. ............ 709/240 |
| 2005/0249198 A1 * | 11/2005 | Goldman et al. ....... 370/352 |

FOREIGN PATENT DOCUMENTS

| | | |
|---|---|---|
| WO | WO 97/16007 A | 5/1997 |
| WO | WO 97/47118 A | 12/1997 |
| WO | WO 98/06201 A | 2/1998 |

OTHER PUBLICATIONS

Adamik, P., *Der Personal-Computer als Komforttelefon*, Funkschau, Franzis-Verlag K.G., Munich, Germany, vol. 68, No. 14, 7 pages, Jun. 21, 1996.
European Patent Office, Supplementary European Search Report for Application No. EP 00912030.4 , 4 pages, Feb. 18, 2005.

\* cited by examiner

*Primary Examiner*—Ajit Patel
(74) *Attorney, Agent, or Firm*—Grossman, Tucker, Perreault & Pfleger, PLLC (57) ABSTRACT

A telephone system wherein all the functions of a digital telephone can be accessed and implemented on a personal computer alone, thereby eliminating the need for a telephone set. By means of the computer display and mouse, keyboard or other input/output command devices, a user accesses and implement all digital telephone functions without the physical telephone set, the personal computer also providing the audio function. A graphical representation of a telephone set or other telephone-related form is provided on the computer display and accessed by the mouse, keyboard or other command device, this being accomplished by a computer program providing graphical interface implementation. A significant advantage of the system is computer access to and utilization of digital telephone functions from a remote location with communication via Internet, LAN, WAN, RAS or other mediums.

8 Claims, 6 Drawing Sheets

DIGITAL BROWSER PHONE

CROSS REFERENCE TO A RELATED APPLICATION

Applicants hereby claim priority based on Provisional Application No. 60/121,755 filed Feb. 26, 1999 and entitled "Digital Browser Phone" which is incorporated herein by reference

BACKGROUND OF THE INVENTION

This invention relates generally to telephone communication systems, and more particularly to a new and improved system wherein all the functions of a digital telephone are usable on a computer.

Digital computers, in particular personal computers, are playing an ever increasing role in telephone systems. For example, the personal computer plays a central role in voice processing systems utilizing computer telephony integration wherein the personal computer is interposed functionally between the telephone switch such as a private branch exchange (PBX) and the telephone set. In addition, the digital telephone itself represents an advance in the additional features and functions it provides over and above those provided by conventional telephones.

SUMMARY OF THE INVENTION

In a basic computer telephone integration, a PBX is connected through a computer telephony interface to a personal computer which, in turn, is connected through another interface to a telephone set, such as a digital telephone. It would be highly desirable and advantageous to provide a telephone system wherein all the functions of a digital telephone can be accessed and implemented on a personal computer alone, thereby eliminating the need for a telephone set. In other words, by means of the computer display and mouse, keyboard or other input/output command devices, a user could access and implement all digital telephone functions without the physical telephone set, the personal computer also providing the audio function. A significant advantage of such a system is computer access to and utilization of digital telephone functions from a remote location with communication via internet, LAN, WAN, RAS or other mediums.

DETAILED DESCRIPTION OF THE INVENTION

Figure 1:
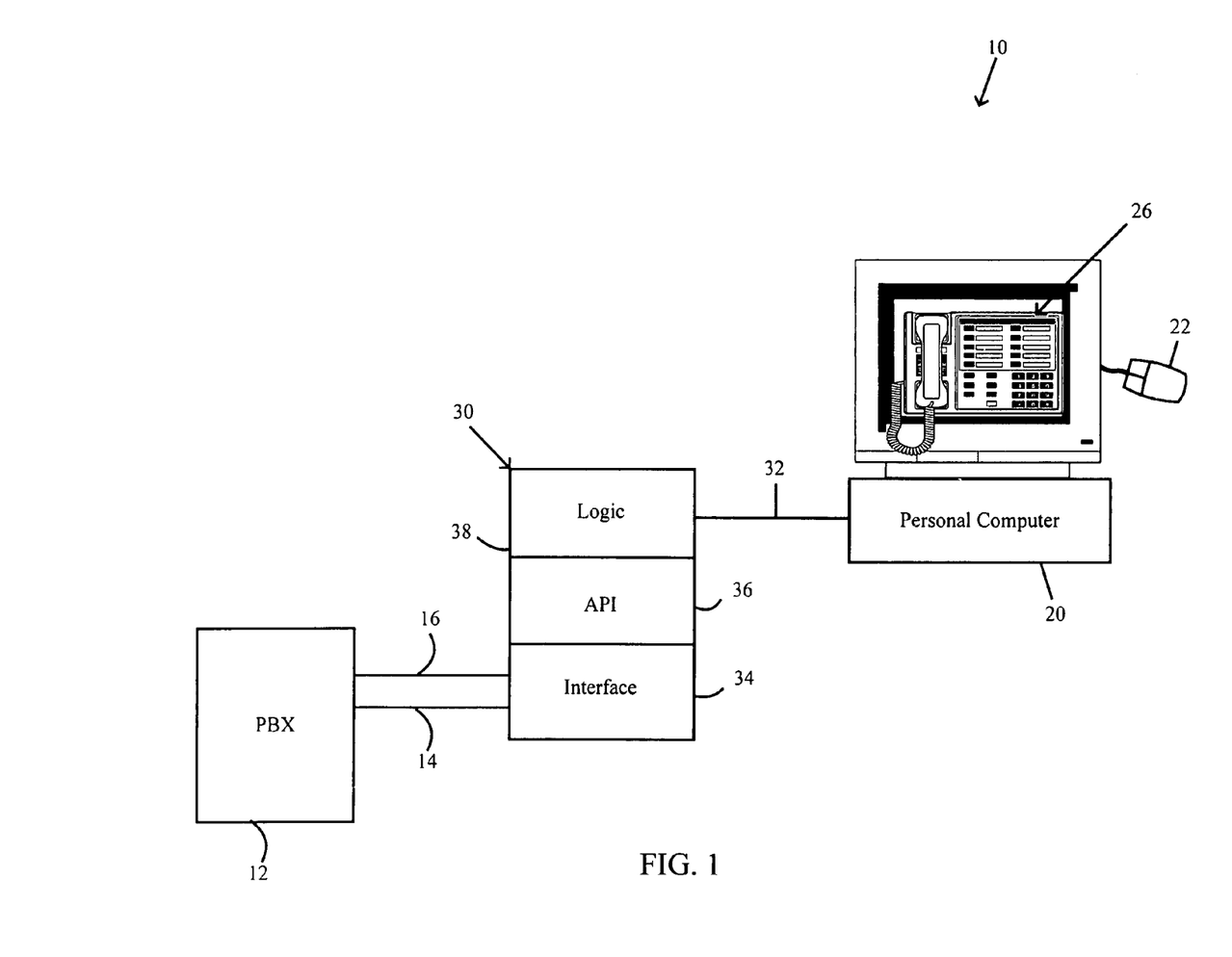
FIG. 1 is a block diagram of the system of the present invention.

A system 10 according to the present invention is summarized briefly in FIG. 1. A PBX or other standard telephone switch is represented at 12 and lines 14, 16 are standard interface lines which connect PBX 12 to a user's telephone network. A standard personal computer (PC) 20 in the present illustration is operated by a mouse 22. Alternatively, PC 20 in the system of the present invention can be operated by a keyboard or some other input device. In accordance with the present invention, a graphical representation 26 of a digital telephone is provided on the display of PC 20. Various telephone functions are accessed by manipulating mouse 22 to place the cursor (not shown) on a particular component of the phone image 26 and then clicking the mouse. For example, to place a call the first step is to remove the headset or receiver from the phone console. This is done by moving mouse 22 so that the cursor is on the representation of the receiver at the left-hand portion of the image 26 and clicking mouse 22. This results in a appropriate command being issued to the remainder of the system to indicate initiation of a call as will be described in detail presently. The foregoing is accomplished by means of a computer program known as ActiveX or other programs providing graphical interface implementation in a manner which will be described in detail presently. By way of further illustration, the next step in the call is dialing the number which is carried out by moving the cursor using mouse 22 sequentially to each of the button graphical representations in image 26 and clicking on each button representation. Each time an appropriate command is issued to the remainder of the system for actual dialing of the telephone number as will be described. While the present illustration includes the preferred image 26 as a representation of a digital telephone, image 26 can have other telephone-related forms such as listing of telephone numbers which the user would have occasion to dial, a menu of telephone features such as conferencing, park and pick, etc. and other forms.

In accordance with the present invention, the system of FIG. 1 further includes a phone server generally designated 30 which couples PBX 12 and PC 20. Lines 14 and 16 from PBX 12 are connected to server 30. A communications link 32 connects server 30 and PC 20 and can be a LAN, WAN, RAS, internet or a modem accessed telephone line to mention a few. The signals associated with PBX 12 and the signals on lines 14, 16 are characterized by synchronous timing which is a standard requirement of PBX operation. The signals on link 32 and associated with PC 20 are asynchronous which is required for the needed flexibility in timing of the operation of PC 20 and communications link 32. Accordingly server 30 makes possible communications between the synchronous operation of PBX 12 and the asynchronous operation of communications link 32 and PC 20. Server 30 allows an asynchronous client such as a web browser operatively associated with PC 20 to communicate via link 32 with a synchronous device such as telephone switch, i.e. PBX, 12.

Briefly, and as shown in FIG. 1, phone server 30 includes a digital phone emulation interface 34, an application program interface 36 and logic 38 which ties link 32 with the interfaces 34 and 36. Interface 34 by way of example is commercially available from Voice Technologies Group, Inc. under the designation VoiceBridge-PC and VoiceBridge 2000. Interface 34 provides a direct digital connection between various PBXs and computer telephony application computers, i.e. PC 20, and their processing cards and increases the amount of integration information that can be utilized from the PBX. Application program interface 36 develops a command set from signals provided by interface 34 which the software in PC 20 can understand. Logic 38 provides the synchronous/asynchronous conversion mentioned above. Thus, logic 38 serves as an intermediary between synchronous switching on the PBX side of server 30 and asynchronous packet switching on the other side of server 30. For example, logic 38 will packetize a request from interface 34 so that it can travel over link 32 and be utilized by PC 20. This enables telephony events from interface 34 to be converted in a way that the object, i.e. the ActiveX program mentioned above, can utilize them in connection with phone image 26.

The selection and performance of various digital telephone functions utilizing the graphical phone image 26 and cursor of PC 20 is accomplished by means of a program providing graphical interface implementation. A preferred program is commercially available from Microsoft Corporation and known as ActiveX control. ActiveX control enables one to develop sophisticated controls based on the common object model (COM) that can be installed in dialog boxes or any ActiveX control container application. ActiveX control is a COM-based object that can draw itself in its own window, respond to events like mouse clicks, and be managed through an interface that includes certain properties and methods.

An ActiveX control is implemented as an in-process server, typically a small object, that can be used in a control container. The control container operates the ActiveX control by using the control's properties and methods, and receives notification from the ActiveX control in the form of events. Thus, a control is described completely by properties, methods and events, and ActiveX is a means of implementing a control. While ActiveX is utilized in the present illustration of the invention, other graphical interface implementations can be employed such as JAVA-APPLET and even lower level software such as C or C++ to name a few.

Figure 2:
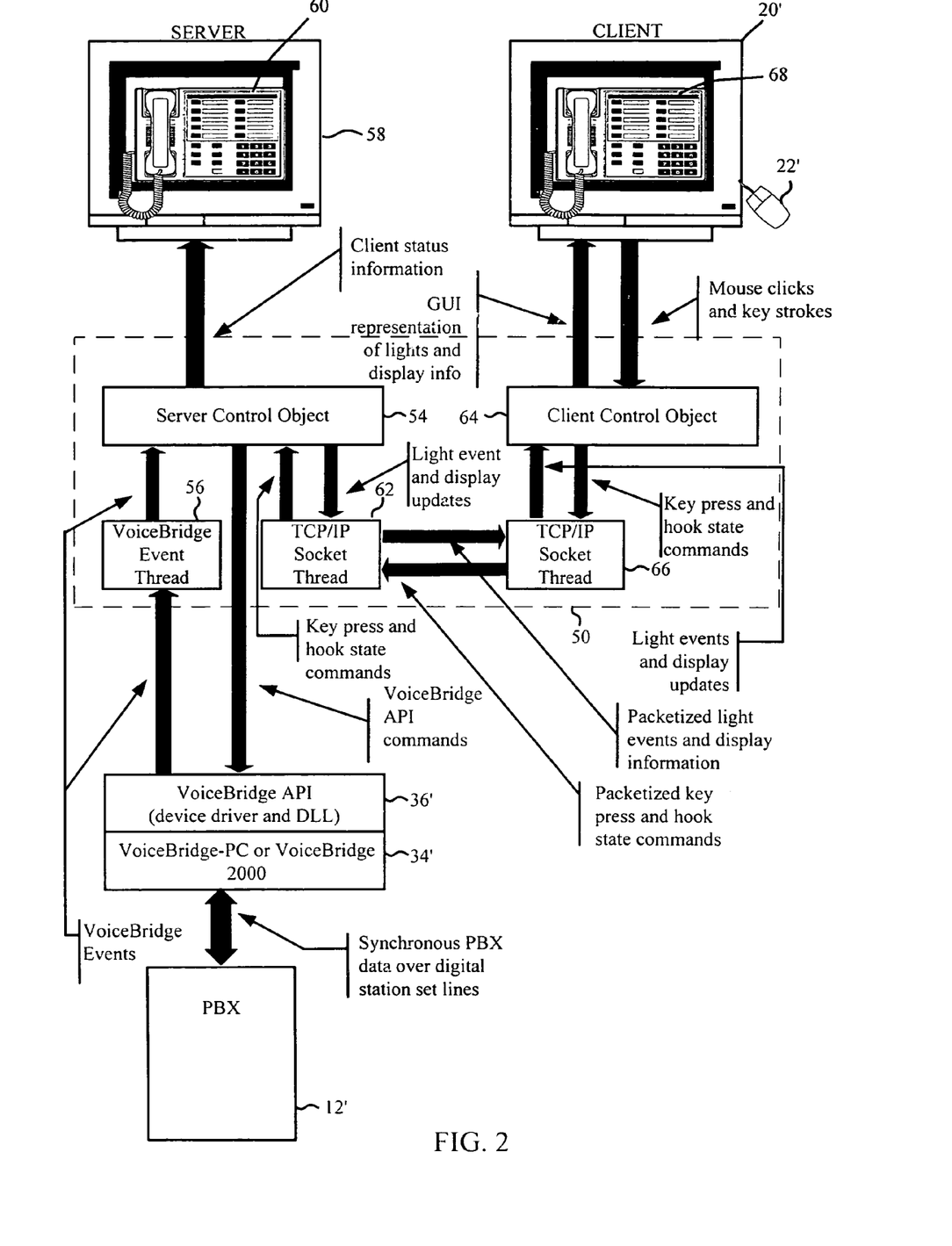
FIG. 2 is a schematic diagram illustrating operation of the system of the present invention.

FIG. 2 illustrates application of the principles of the system 10 of FIG. 1 to performing digital call control over internet protocol (IP). In other words, by virtue of the system of FIG. 2 all the call control features of a digital telephone are provided to a user on a PC wherein the features are accessed by the PC via the internet and selection and use of those features is via the graphical image of the phone or the like with mouse or keyboard interaction.

In the system illustrated in FIG. 2, PBX 12', PC 20', mouse 22', digital phone emulation interface 34' and application program interface 36' are similar to the corresponding components in the system 10 of FIG. 1. In the system of FIG. 2, some of the control components are actually the same C++ object, but behave differently based on whether the control is configured as the client or as the server. For this reason, the following description is separated into client and server sections. The components within the broken line region 50 all reside within the same control which has methods, properties and events which will be described in further detail presently.

The server control object 54 is responsible for the following functions. Object 54 translates VoiceBridge light events and display updates from the VoiceBridge Thread 56 into graphical user interface (GUI) representations of these events for display on a server monitor 58. The GUI representation 60 is a soft phone that looks like the actual digital station set that the VoiceBridge interface 34' emulates. In this implementation, the soft phone provides a mirror image of what the client is seeing on his/her PC 20'. The mirror image is a means to provide status of client activity.

Server control object 54 also translates key press and hook state commands from the TCP/IP Socket Thread 62 into GUI representations of these for display on the server monitor 58. This completes the mirror image described above. Object 54 translates key press and hook state commands from the TCP/IP Socket Thread 62 into VoiceBridge API commands for execution and interaction with the PBX 12'. Object 54 also translates VoiceBridge light events and display updates from the VoiceBridge Event Thread 56 into a format suitable for subsequent packetization by the TCP/IP Socket Thread 62.

The TCP/IP Socket Thread 62 has the following responsibilities when the control 50 is acting as a server. It packetizes light events and display updates from the Server Control Object 54 for transmission over a socket to the client, and it accepts packetized key press and hook state commands from the client, unpacketizes these commands and submits them to the Server Control Object 54 for execution using VoiceBridge API Commands or display on the GUI. The VoiceBridge Event Thread 56 is responsible for monitoring the VoiceBridge event Queue for incoming light events and display changes using the VoiceBridge API 36' and submitting these events to the Server Control Object 54 for further processing.

The VoiceBridge API 36' and the VoiceBridge Card 34' together provide a suitable interface to the PBX 12'. The VoiceBridge Card 34' handles all low-level interactions with the PBX 12' over synchronous digital station links. The VoiceBridge API 36' provides a means for the rest of the control 50 to interact with the PBX 12' using the VoiceBridge internal virtual phone.

The client control object 64 is responsible for the following functions. Object 64 translates mouse clicks and key strokes from the client machine 20' into the commands suitable for subsequent packetization by the TCP/IP Socket Thread 66. The mouse clicks and key strokes are input by the user from a GUI representation of a soft phone 68 as previously described. Similar to the server GUI 60, the client GUI 68 is a soft phone that looks like the actual digital station set that the VoiceBridge 34' emulates. Client control object 64 also translates light events and display updates from the TCP/IP Socket Thread 66 into graphical representations on the client monitor 20. These events are displayed on the GUI soft phone 68 described above.

The TCP/IP Socket Thread 66 has the same responsibilities as described in the server section, but in reverse. That is to say, key press and hook state commands come from the client object and are packetized and sent to the server. Light updates and display updates are taken from the server, unpacketized and passed to the client object for further processing.

To one skilled in the art, it is apparent that programming methods other than socket and threads, as well as protocols other than TCP, IP and H.323 (such as ATM, MGCP or SIP) can be utilized to implement the client and server control objects described herein.

Figure 3:
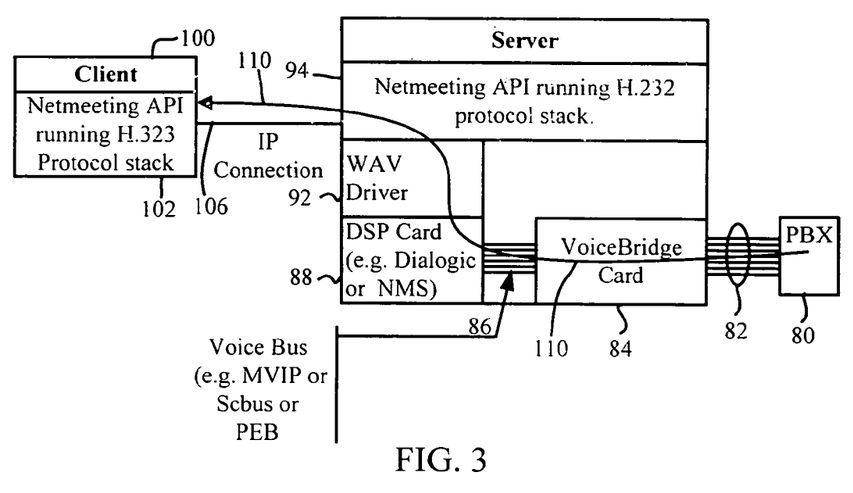
FIG. 3 is a schematic diagram further illustrating an aspect of the operation of the system of the present invention.
Figure 4:
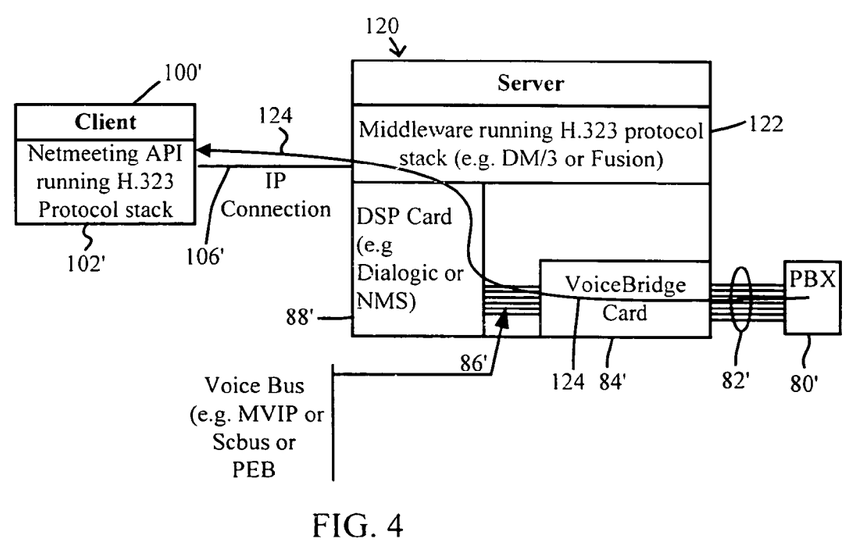
FIG. 4 is a schematic diagram further illustrating another aspect of the operation of the system of the present invention.

FIGS. 3 and 4 illustrate architectures of the control that include voice and digital control over internet protocol (IP). The control is used in a client/server environment to provide access over IP to digital station set features from a remote location. In the architecture of FIGS. 3 and 4 the voice component of the control is handled in one of two ways. The method of FIG. 3 uses a WAV interface available from Dialogic or Natural Microsystems (NMS) or other means in conjunction with the Microsoft NetMeeting version 2.1

SDK to provide an H.323 protocol stack with audio capabilities. The method of FIG. 4 uses an H.323 protocol stack (middleware) provided by the Dialogic DM3 platform, NMS Fusion platform or other means. Both methods employ the NetMeeting version 2.1 SDK on the client side.

Referring first to FIG. 3 a PBX 80 is connected via digital lines collectively designated 82 to a digital phone emulation interface 84 in a manner similar to PBX 12, lines 14, 16 and interface 34 in the arrangements illustrated in FIGS. 1 and 2. Interface 84 is connected via a voice bus 86 to a digital signal processor (DSP) 88 included in the server control 90. Control 90 also includes WAV interface 92 and protocol stack 94. The client control 100 also includes a protocol stack 102, and the server and client controls 90 and 100, respectively, are connected by an IP communications link 106.

Thus, the voice over IP method of FIG. 3 uses a WAV interface provided by Dialogic, NMS or other means. With this method, the controls 90 and 100 use NetMeeting version 2.1 API calls to handle all connection establishment and capabilities negotiation on both the server and the client side. The audio channel is left open throughout the duration of the client/server session. Silence is transmitted until the VoiceBridge interface 84 opens an audio channel with the PBX 80 (i.e. when a phone call is made or answered). This provides the desired effect that audio is "cut through" when a call is initiated or answered.

The arrow 110 in FIG. 3 shows the audio path. The PBX 80 provides audio to the VoiceBridge interface 84, which drives voice data onto the voice bus 86. This voice data is taken from the voice bus by the DSP card 88 and provided to the server PC (not shown) through WAV interface 92. The NetMeeting software 94, 102 utilizes this WAV interface 92 to implement the H.323 protocol which includes specifications for connection negotiation (H.245) and for voice packetization and transmission (Real Time Protocol—RTP).

Referring now to FIG. 4, which illustrates voice over IP using middleware, components similar to those of the architecture of FIG. 3 are identified by the same reference numerals provided with a prime designation. Server control 120 includes middleware 122 and arrow 124 indicates audio path. The client implementation does not change for this method. The server does change and now uses middleware 122 such as DM/3 IPLINK from Dialogic or Fusion from NMS to provide the interface on the client side. This middleware provides the H.323 protocol stack in place of the NetMeeting SDK. The voice path indicated by arrow is very similar to that in the method of FIG. 3.

Figure 5:
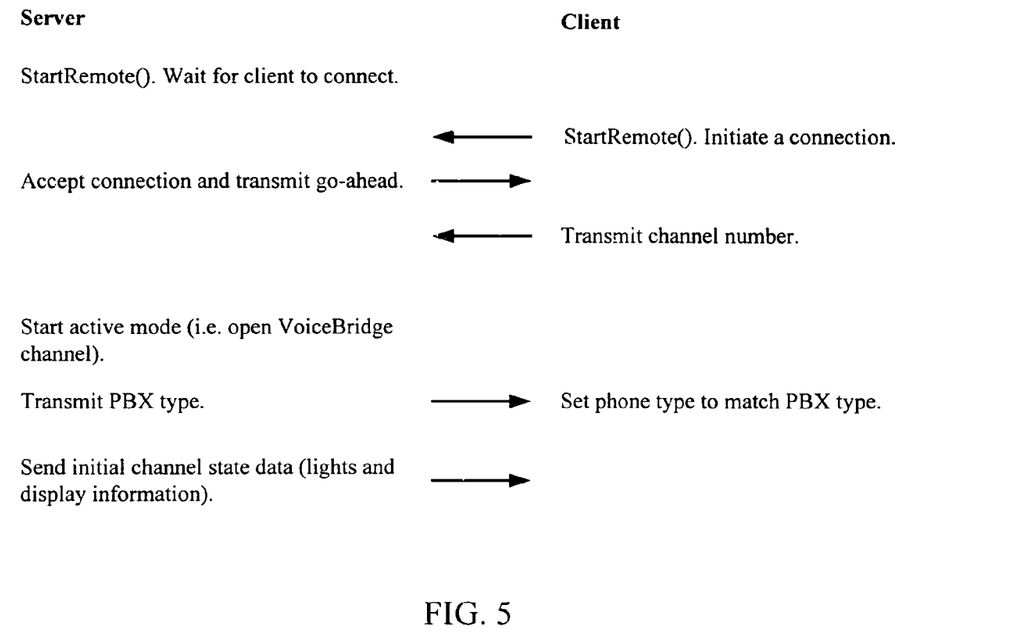
FIG. 5 is a flow chart illustrating operation of the system of the present invention.

The system of FIG. 2 is illustrated further by the following example transactions. The first illustrative example is establishing a client/server connection. Before the client can establish a connection with the server, the server must be waiting for a client connection. A control method designated StartRemote ( ) with a parameter of FALSE is executed to start the server waiting for a client connection. Start Remote and other control methods and parameters will be described in further detail presently. Next, the client control's RemoteHostName parameter is set to the IP address of the server (i.e. 204.242.28.197). Then the control method StartRemote ( ) is executed with a parameter of TRUE. This will start the initial handshaking sequence between the client and the server. The initial handshake sequence is outlined in FIG. 5.

The next illustrative example is a client key press transaction. The following sequence describes an entire key press transaction, from the client machine to the PBX for execution in reference to the components of FIG. 2. A hook state transaction is identical to the following sequence, only the data transmitted is different.

1. The client user presses a GUI phone key on image 68 using his/her mouse 22'.
2. The Client Control Object 64 is notified on the mouse press and determines the key number (ID) of the GUI phone key that was pressed and tells the TCP/IP Socket Thread 66 to transmit the key press command to the server.
3. The client's TCP/IP Socket Thread 66 builds a key press packet with the appropriate key number and supporting information and sends this data to the server via a socket command.
4. The server's TCP/IP Socket Thread 62 receives the key press command packet, un-packetizes the command and tells the Server Control Object 54 to press the key.
5. The Server Control Object 54 then issues a vb_press_key ( ) command to the VoiceBridge API 36'. The press key command will be described in further detail presently. At the same time, the Server Control Object 54 shows the key press on the server GUI 60 for the purpose of activity trace.
6. The VoiceBridge API 36' passes the command to the VoiceBridge card 34', which sends the command along to the PBX 12' over the synchronous digital data link. The PBX 12' then acts on the key press appropriately.

The next illustrative example is a light update sequence. The following describes an entire light update transaction. This sequence is very similar to the key press sequence described above, but this time is initiated by the PBX 12' and terminates on the client GUI phone 68. Note also that a display update sequence is identical to the following sequence, only the data transmitted is different.

1. The PBX 12' sends a light update data packet over the digital data link to the VoiceBridge card 34'.
2. The VoiceBridge Event Thread 56 receives the light update via an event generated by the VoiceBridge card 34' and passed through by the VoiceBridge API 36'.
3. The VoiceBridge Event Thread 56 passes the light update event to the Server Control Object 54. The server control tells the server's TCP/IP Socket Thread 62 to transmit the light event to the client.
4. The server's TCP/IP Socket Thread 62 packetizes the light event information, including the light number and new state, and transmits this information to the client via socket commands.
5. The client's TCP/IP Socket Thread 66 receives the light update packet, un-packetizes the update and notifies the Client Control Object 64 of the light update.
6. The Client Control Object 64 then displays the new light state on the lamp image in the GUI phone 68.

The various properties, methods and events of the control associated with the system of FIGS. 2–4 now will be described. The methods and properties of the control allow its container to press keys (using the mouse or a method), set and get light states, set and get the hook state and set and get the display information for the phone. In addition, multiple phone types and sizes can be configured. The capability to interact with the VoiceBridge card 34 is provided inside the ActiveX control. This allows full control of a single VoiceBridge channel from within a web page, Visual Basic program or even within a Power Point presentation. Client/server capabilities are included in the control. This allows for complete remote operation (call control) of the ActiveX control over a TCP/IP socket. As previously described, a client computer (i.e. a laptop) connects to a server using a TCP/IP socket. The server machine contains a VoiceBridge card that is connected to a PBX. The server control accepts key press and hook state commands from the client, allowing a remote user to interact with the VoiceBridge channel. The client, in turn, accepts lamp updates, display updates and gain/loss of carrier events from the server, thereby providing full status of the VoiceBridge line from a remote location.

The custom properties of the control are set forth in Table I. In the right-hand column various characteristics are described. When the container changes the properties, changes occur in the characteristics.

TABLE I

| Property Name | Property Type | Description |
|---|---|---|
| PhoneType | Short | Changes the type of phone displayed. 1 (LUCENT7434), 2 (MITELSS430), 3 (NORTEL2616), 4 (SIEMENSROLMPHONE400) |
| SizePercent | Short | Percentage full scale. Using this value will scale the phone and maintain the original aspect ratio. Set this value to (−1) if the control is to be sized by other means - i.e. using the container's object handles. Min - 25% Max - 600% |
| KeyUpDownDelay | Short | The time in milliseconds that a key will be pressed when using the PressKey( ) method (keys automatically pop back up when using PressKey( )). Min - 0 msec Max - 1000 msec |
| InteractiveMode | BOOL | TRUE - User can press keys and go on and off hook using the mouse. FALSE - No input is accepted from the user via mouse clicks. |
| DummyCaps | BSTR | This is a dummy parameter used to help serialize (store) all of the key information for the control. The contents of this parameter can not be set or seen by the user. |
| DisplayText | BSTR | This is the test contained in the display. The string can be any length and will auto wrap at a column break. Strings that are too long will be truncated when displayed, but stored at full length. To output to the second row, pad with spaces. DO NOT USE A NEWLINE CHARACTER OR CONTROL CHARACTER. |
| EnableToolTips | BOOL | TRUE - pop up tool tips enabled. FALSE - pop up tool tips disabled. |
| controlID | Short | This ID is used for identifying phone events in a recorded event file. It is a tab that is associated with each recorded event. This allows recording and subsequent playback of multiple sets of data into a single file. This ID is also used as the VoiceBridge channel number when the control is used to drive a VoiceBridge Channel. |
| RemoteHostName | BSTR | This identifies the IP address of the remote host. This parameter must be set before the client is put into remote mode with the StartRemote ( ) method. |

The custom methods of the control are set forth in Table II. The parameters in the middle column indicate the actions to be taken. The definitions in the right-hand column are part of the ActiveX definitions. The container of the ActiveX control can interact with the methods set forth in Table II. The StartActivePCMode method is used when the communications link is not IP. The StartRemote method is used when the communications link is with IP.

TABLE II

| Property Name | Property Type | Description |
|---|---|---|
| PressKey | INT keyNum | Press the key specified by keyNumber The key automatically releases after "KeyUpDownDelay" milliseconds. |
| SetLightState | INT lightNum INT newState | Set the specified lamp to a new flash state. The rates of flashing are predetermined by the phone type and can not be modified by the user. Valid states are: DARK 0 STEADY 1 FLASH 2 BLINK 3 WINK 4 |
| SetHookstate | BOOL state | TRUE take the phone off hook. FALSE put the phone on hook. |
| GetLightState | INT lightNum | Returns the light state as a short. The states are described in SetLightState above. One additional return has been added. UNKNOWN 99 If an invalid light number is passed into GetLightState, it will return UNKNOWN. |
| GetHookstate | NONE | Returns the current state of the hook switch. TRUE means the phone is off hook. FALSE means the phone is on hook. |
| SetKeyCaption | Short keyNum BSTR caption | Sets the caption text of the specified key. Strings that are too long are simply |

TABLE II-continued

| Property Name | Property Type | Description |
|---|---|---|
| | | truncated when displayed. |
| GetPhoneSize | Long*sizeX Long*sizeY | Returns the size of the control in HIMETRIC units. |
| GetKeyCaption | Short keyNum | Returns the caption of the key specified by keyNUM. |
| IsValidKey | Short keyNum | Returns TRUE if the key specified by keyNUM is a valid key (i.e. if the key number is on the phone). Otherwise returns FALSE. |
| IsValidLight | Short lightNum | Returns TRUE if the light specified by lightNUM is a valid light (i.e. if the light number is on the phone). Otherwise, returns FALSE. |
| StartActivePC Mode | Long password | Use this method to start controlling a VoiceBridge channel. The channel number is specified in the controlID property which must be set before calling this method. NOTE: Active PC phone mode is only supported in Windows NT. A VoiceBridge SDK must be installed on the system and the VoiceBridge card must be loaded before going into active mode. |
| StartRemote | BOOL clientOrHost | The meaning of this command varies slightly depending on the value of clientOrHost. To be a host, set the clientOrHost parameter to FALSE. The control then waits for a client to connect on socket number 333 of the machine. Once connected, the host then starts active PC mode automatically and negotiates channel number and PBX type with the client. NOTE: Host mode is only supported in Windows NT. A VoiceBridge SDK must be installed on the system and the VoiceBridge card must be loaded before connecting in host mode. To be a client, set the clientOrHost parameter to TRUE. The control will then try to establish a connection with a shot waiting at the IP address specified in the RemoteHostName property. If no host is waiting, or if another network error occurs, the error is reported to the application. NOTE: Client mode is |

TABLE II-continued

| Property Name | Property Type | Description |
|---|---|---|
| | | supported under Windows NT and Windows 95. The controlID of the client |

The custom events of the control are set forth in Table III. The events occur from the control to the container to indicate what happened, i.e. they provide a notification. The six status events in Table III are related to the record/playback methods of Table II and tell the container what to do, i.e. enable or disable keys.

TABLE III

| KeyPressed | int keyNumber | The user pressed a key with the mouse. |
|---|---|---|
| KeyReleased | int keyNumber | The user released a key previously pressed with mouse. |
| OffHook | NONE | The user took the phone off hook using the mouse. |
| OnHook | NONE | The user put the phone on hook using the mouse. |
| KeyCaptionChanged | Int keyNumber | The caption of the key specified by keyNumber was changed by the user. |
| KeyPressed | int keyNumber | The user pressed a key with the mouse. |
| LightChange | Short lightNum | The light specified by lightNum changed flash states. |

Figure 6:
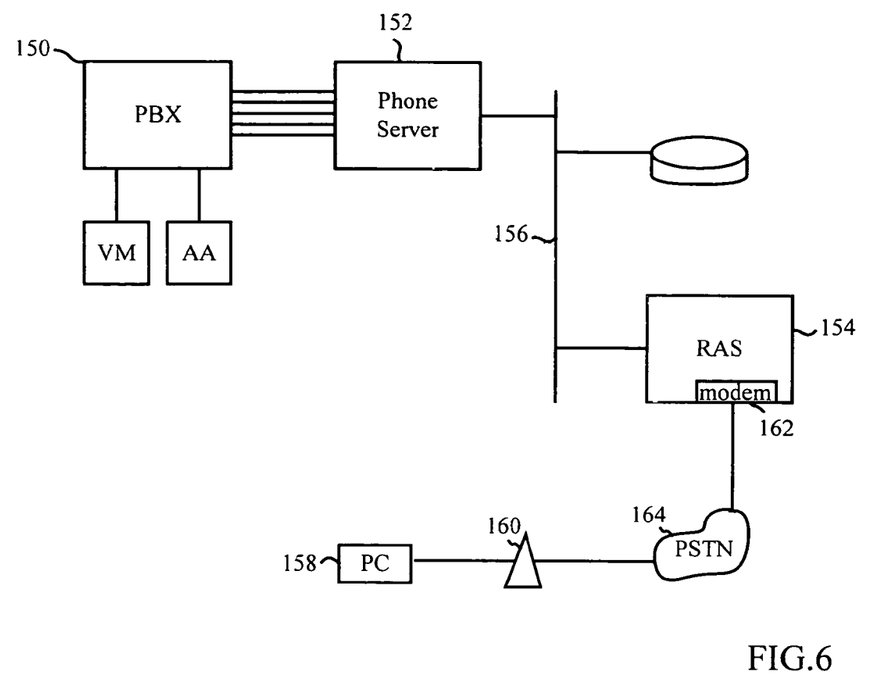
FIGS. 6–9 are schematic block diagrams illustrating applications of the system of the present invention.

The architecture of the system of the present invention described in connection with FIGS. 2–5 performs digital call control over IP. As previously mentioned, the control can be used in a client/server environment to provide access to digital station set features from a remote location. A number of highly useful and desirable applications can result from this capability. FIG. 6 illustrates utilizing the foregoing capability to provide full digital station features to telecommuters. PBX 150 and phone server 152 are similar to PBX 12 and server 30 in the system of FIG. 1. A remote access server (RAS) 154 is connected to a local area network (LAN) 156 which, in turn, is connected to phone server 152 of the present invention. RAS 154 provides a dial-in connection to the LAN 156. The personal computer 158 of the telecommuter is connected to RAS 154 via the respective modems 160 and 162 and the telephone network, 164.

Thus, a telecommuter can connect to the office Local Area Network (LAN) 156 using Remote Access Software (RAS) 154 and use all of the capabilities of a digital station set while at home. And if the telecommuter also has a phone at the office, the control can be set up to ring when the office phone rings (i.e. the telecommuter's desk phone can be bridged onto the control). This allows callers to use the telecommuter's normal office number to reach the telecommuter when they are working at home. In addition, the telecommuter can simultaneously access data (i.e. e-mail, file servers etc.) over his RAS line.

The foregoing also allows creation of remote call centers. Because the control provides all PBX features to remote users, the ACD features of the PBX can be extended remotely. This allows call center agents to be a part of the same ACD queue—even though they may be thousands of miles apart. This saves money on office space and also provides a tremendous increase in flexibility in providing call center overflow scenarios.

Figure 7:
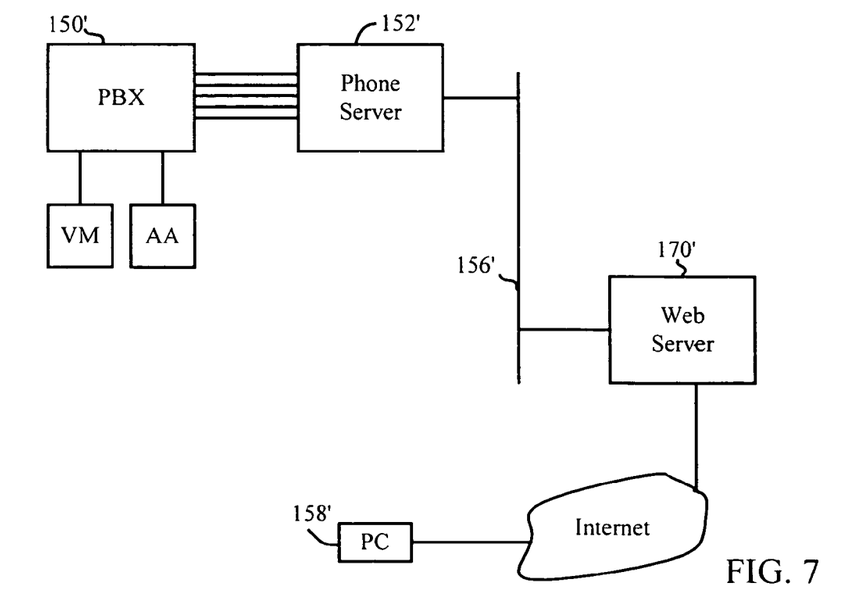

FIG. 7 shows an arrangement similar to FIG. 6 but wherein the telecommuter connects to the office LAN 156' via a web server 170 through internet access.

Figure 8:
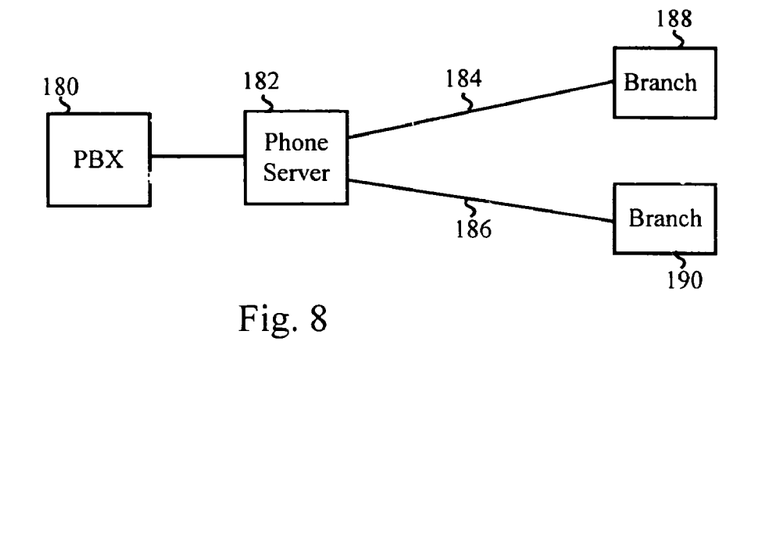

The application illustrated in FIG. 8 provides linking of remote offices back to the corporate PBX and mail system. PBX 180 and phone server 182 are similar to PBX 12 and server 30 in the system of FIG. 1. Dedicated lines 184 and 186 of a wide area network (WAN) connect branch office or location 188 and 190, respectively to the main office or location. Thus, since many remote offices already have dedicated data tie lines for accessing corporate databases, e-mail etc., the control of the present invention can extend PBX connectivity to remote branches. And because the remote offices are all using the same PBX, a single company voice mail system can be deployed. This eliminates all of the difficulties and expense of trying to tie together many disparate phone systems and/or voice mail systems into a single seamless system.

Figure 9:
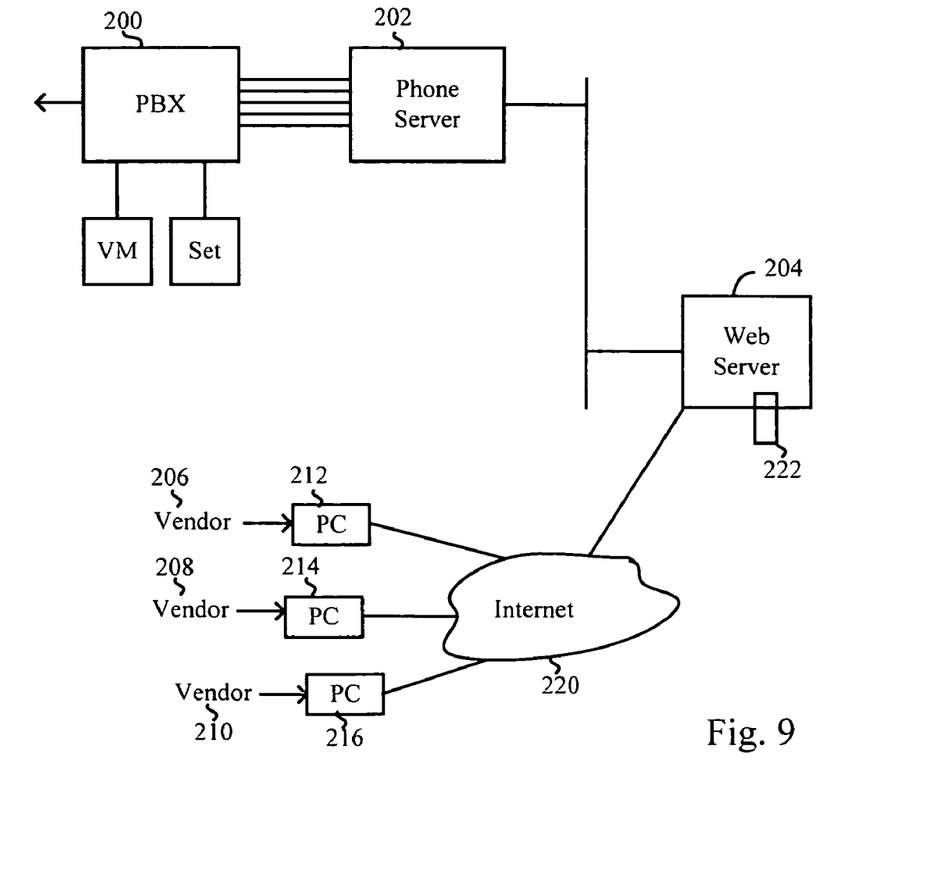

FIG. 9 illustrates an application which provides toll free calls and voice mail boxes to preferred vendors and customers. PBX 200 and phone server 202 are similar to PBX 12 and server 30 in the system of FIG. 1. A web server 204 is operatively connected to phone server 202. Vendors 206, 208 and 210 through their PCs 212, 214 and 216, respectively, and the internet 220 access web server 222 and ultimately phone server 202. Vendors and customers can be given an extension on the PBX 200 by giving them a personal web page containing the control on the company's Intranet or Internet web site 222. When a vendor/customer needs to be contacted or needs to place a call in to the company, their three of four digit extension is dialed— instead of their long distance PSTN number. Since the call takes place over the Internet, no toll charges are applied. And because they are an extension on the PBX 200, the vendor or customer can be given a company voice mail box and can be left messages, replied to and put on voice mail distribution lists.

As further examples, other client applications are enabled through the client control such as a voice mail application and a telephone device. The client control described above makes use of a mouse, keyboard or other input devices to direct commands to the server control. A voice mail application is another input device that can be connected as a remote client control. As calls are directed from the PBX to the server control, these events are delivered to the voice mail client control. In response to these events, a voice mail application will typically answer the incoming call, take input from the calling party and record a message or redirect the call to another telephone extension. These actions taken by the voice mail application are presented as input to the client control which are then delivered to the server control as previously described. The present invention thereby eliminates the need for the voice mail application to be located within the distance restrictions of the PBX, and furthermore enables alternate connection means to this PBX similar to link 32 in FIG. 1. A telephone can also act as the input/output device of the client control. Key presses of the telephone are used as input by the client control and directed to the server control. Commands from the PBX are directed to the client control through the server control and presented to the telephone attached to the client control for interpretation by a user.

It is therefore apparent that the present invention accomplishes its intended objectives. While embodiments of the present invention have been described in detail, that has been done for purposes of illustration, not limitation.

The invention claimed is:

1. An apparatus, comprising:
   an interface to connect to a synchronous digital link and to send and receive digital signals to and from a telephone switch over the synchronous digital link;
   a controller to generate graphical display information and events based on the digital signals received over the interface; and
   logic to communicate over an asynchronous digital link, to convert the digital signals to an asynchronous format, and to transmit the digital signals and the graphical display information and events over the asynchronous digital link, wherein the logic is arranged to receive key press and hook state commands over the asynchronous digital link.

2. The apparatus of claim 1, wherein the logic is arranged to display a digital telephone on a display device, the digital telephone including the graphical display information and events.

3. A method, comprising:
   receiving digital data from a public branch exchange (PBX) over a synchronous digital communication link;
   generating graphical display information and events based on the received digital data;
   transmitting the graphical display information and events over an asynchronous Internet protocol (IP) link;
   receiving a key press and hook state command over the asynchronous Internet protocol (IP) link;
   translating the key press and hook state command to a different format; and
   transmitting the translated key press and hook state command to the PBX over the synchronous digital communication link.

4. The method of claim 3, wherein the graphical display information is related to graphical representation of a digital telephone.

5. The method of claim 3, further comprising:
   graphically representing a digital telephone on a display device, the digital telephone including the graphical display information.

6. A computer readable medium including instructions that, when executed, cause a computer to:
   convert received light events and display updates to a graphical format;
   cause a first display device to display a digital telephone including the light events and display updates;
   convert received input device data that is related to the displayed digital telephone into a packetized format, wherein the input device data includes a key press and hook state commands over asynchronous Internet protocol (IP) link; and
   transmit the packetized input device data over the asynchronous Internet protocol (IP) link.

7. The medium of claim 6, further comprising instructions that, when executed, cause the computer to:
   emit audio information from a speaker that is received over the asynchronous IP link.

8. The medium of claim 6, further comprising instructions that, when executed, cause the computer to:
   convert input voice data into a packetized format; and
   transmit the packetized input data over the asynchronous IP link.

* * * * *